Aug. 4, 1936.   P. C. KEITH, JR., ET AL   2,050,007
CONTINUOUS ROTARY FILTER
Filed May 11, 1935   4 Sheets-Sheet 1
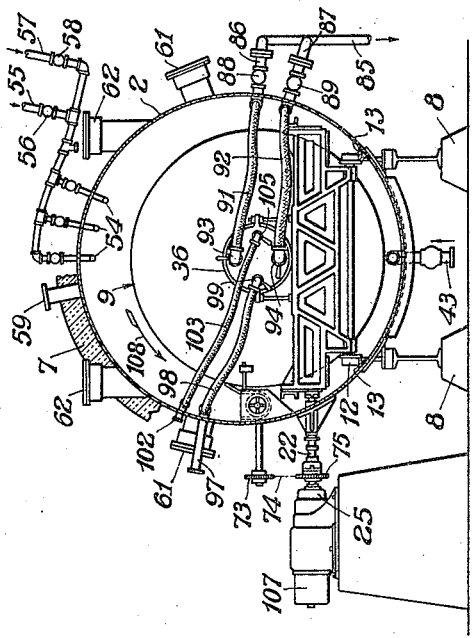
Inventors:
Percy C. Keith, Jr.
Henry O. Forrest
Lee Van Horn
By Donald E. Payne
ATTORNEY Aug. 4, 1936. P. C. KEITH, JR., ET AL 2,050,007
CONTINUOUS ROTARY FILTER
Filed May 11, 1935 4 Sheets—Sheet 3
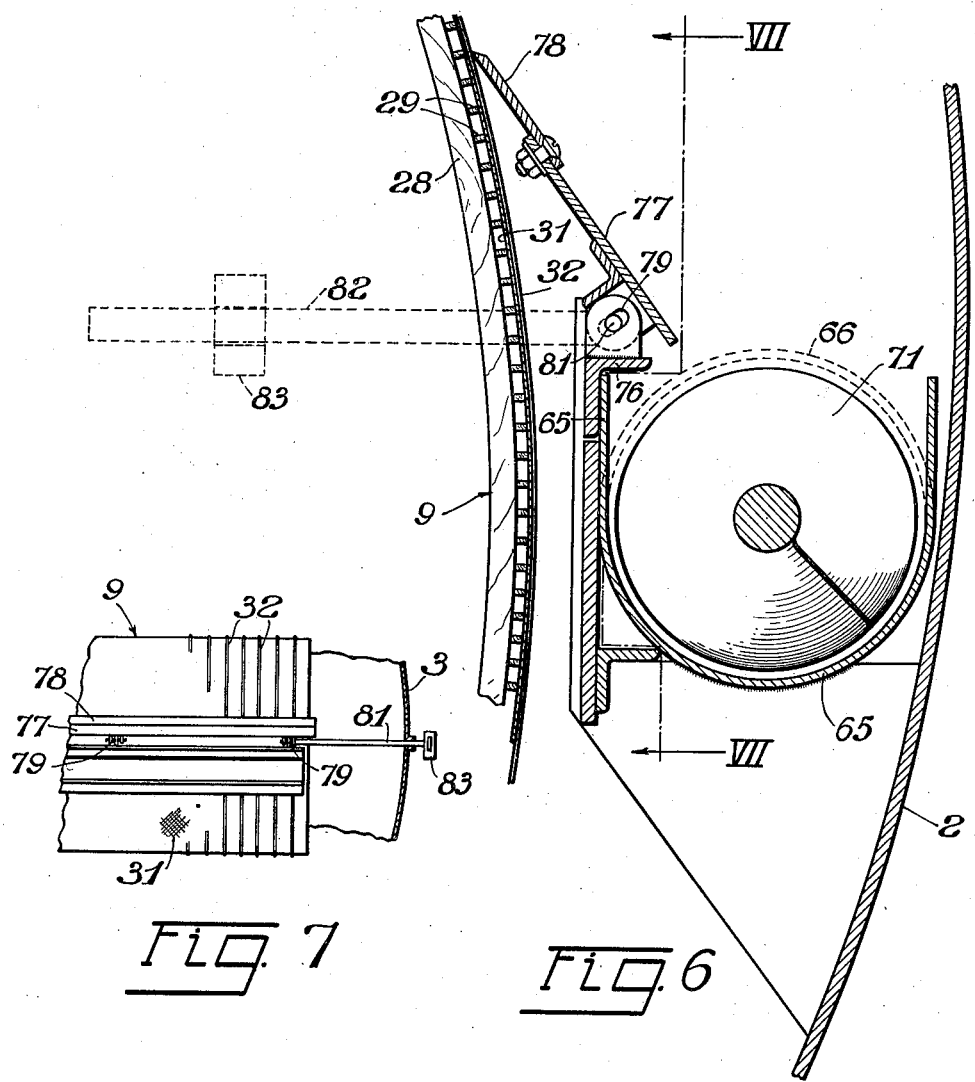
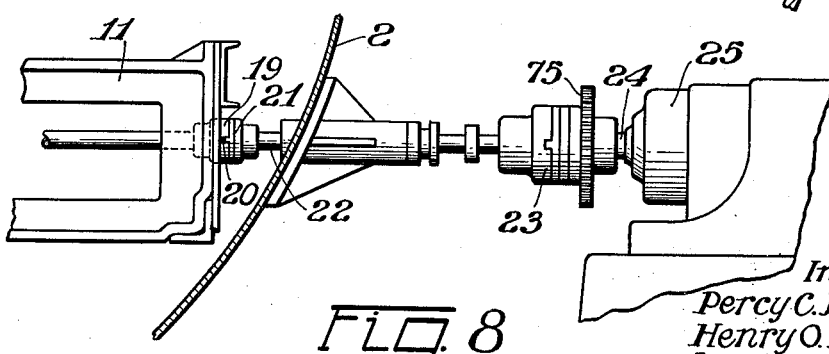
Inventors:
Percy C. Keith, Jr.
Henry O. Forrest
Lee Van Horn
BY
ATTORNEY Aug. 4, 1936.  P. C. KEITH, JR., ET AL  2,050,007
CONTINUOUS ROTARY FILTER
Filed May 11, 1935  4 Sheets-Sheet 4

Inventors:
Percy C. Keith, Jr.
Henry O. Forrest
Lee Van Horn
By Donald E. Payne
ATTORNEY Patented Aug. 4, 1936

2,050,007

UNITED STATES PATENT OFFICE 2,050,007

CONTINUOUS ROTARY FILTER

Percy C. Keith, Jr., Peapack, Henry O. Forrest, Teaneck, and Lee Van Horn, Elizabeth, N. J., assignors to Standard Oil Company, Chicago, Ill., a corporation of Indiana Application May 11, 1935, Serial No. 20,950

6 Claims. (Cl. 210—201)

This invention relates to improvements in continuous pressure filters of the rotary drum type.

A filter constructed according to this invention is especially adaptable for use in the dewaxing of lubricating oil stock by filtration at reduced temperatures. In such processes a diluent such as liquid propane may be added to the oil stock and the mixture chilled to cause the wax to solidify in the form of crystals. The wax slurry thus formed may be introduced into the filter at a temperature approximating −40° F. and the wax-free oil solution caused to pass through the filter cloth of the drum under a pressure differential of approximately 4 pounds, thereby removing the wax in the form of a wax cake deposited upon the outer wall of the filter drum.

It is therefore an object of our invention to provide a filter for such purposes that is compact in size and which, without manual supervision, may operate continuously, not only as to the passage of the stock through the filter medium, but as to the washing of the filter cake, the drying of the cake and the removal of the cake from the drum to a point external of the filter.

Another object is to provide a filter unit for continuous pressure filtration wherein the filter shell performs the double function of a pressure shell and slurry container, thereby permitting the use of a shell of relatively small diameter with respect to the diameter of the rotatable filter drum receivable therein.

A further object is to provide a filter unit, as described, having a mobile filter drum assembly movable upon rails into and out of the shell interior wherein a coupling between the filter drum and a drive unit located externally of the shell is established when the drum assembly is moved along the rails to its operating position within the shell, and wherein all fluid connections to and from the mobile drum assembly may be quickly and easily established, or broken, from the forward end of the shell when the head of the shell has been swung into open position.

Another object is to provide an improved continuous filter as described wherein the scraper mechanism forms a part of the filter shell assembly and may be regulated from a point external of the shell, or moved, at will, into or out of engagement with the drum as during the removal of the filter drum from the shell or during the replacement of the drum therein.

A further object is to provide an improved continuous filter installation, including a plurality of individual filter units whereby the drum of one unit may be transferred to another or removed to a station for repair or treatment as desired. If desired, an additional filter drum may be provided, in such installation, which may be substituted for one in process of repair, thus to maintain all of the units in normal operation at all times.

Other objects, the advantages, and uses of the invention will become apparent after reading the following specification and claims, and after consideration of the drawings forming a part of the specification, wherein:

Figure 1 is a side elevation, partly in section, of a continuous rotary filter constructed in accordance with the invention;

Figure 2 is a front end elevation of the filter with the head of the shell removed;

Figure 3 is a sectional view of the filter shell with the filter drum assembly withdrawn therefrom;

Figure 6 is a sectional view of the scraper and screw conveyor mechanism of the filter;

Figure 7 is a side elevation of the drum assembly looking along the line VII—VII of Figure 6;

Figure 8 is a side elevation of the coupling mechanism for the filter drum drive shaft;

Figure 4:
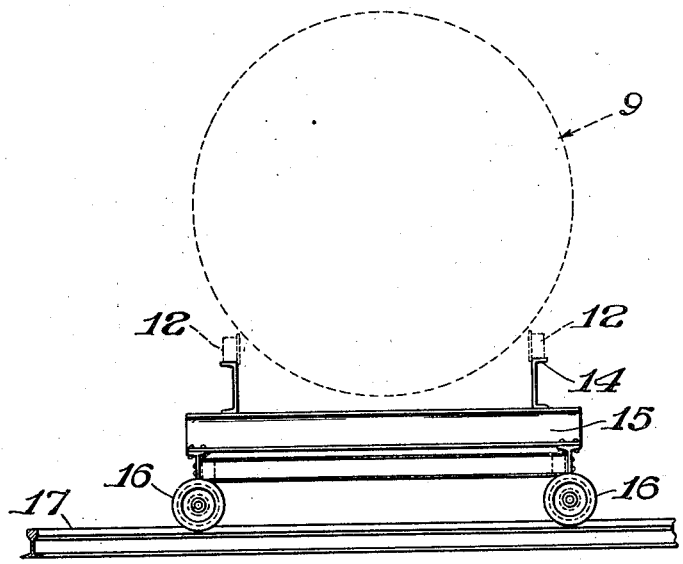
Figure 4 is a side elevation of the transfer carriage for the mobile filter drum assembly.
Figure 5:
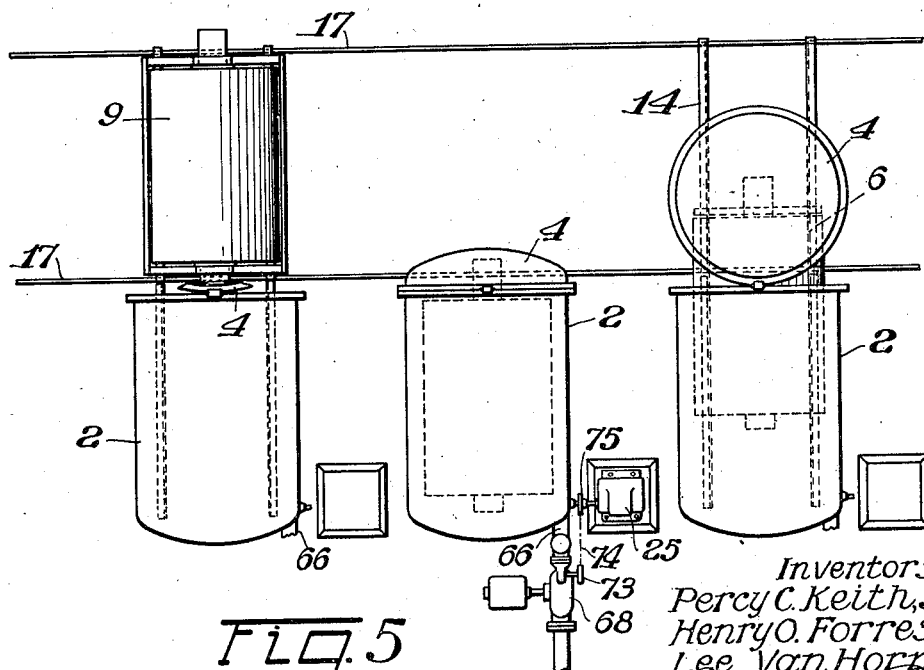
Figure 5 is a top plan view of a multiple filter unit installation illustrating the carriage and track arrangements for the transfer of the filter drum assemblies from one filter shell to another, or to a repair or treating station.

With reference particularly to Figures 1 to 3 inclusive of the drawings, the filter unit we have selected for illustration herein may comprise a cylindrical steel shell 2 having its rearward end 3 permanently closed and provided with a head 4 at its opposite end hingedly mounted as at 5 upon the shell so that it may be swung into the position indicated in Figure 3, at will, thereby to provide an entrance opening through which the filter drum assembly, indicated at 6, may pass to and from the interior of the shell. Insulation 7 may be placed about the entire exterior wall of the filter shell and head so as to reduce heat losses through the walls thereof, an arrangement which is necessary for efficient operation of the filter at reduced temperatures. The shell 2 may be mounted permanently upon a stationary base 8 and suitable mechanism, not shown, provided for the elevation of the head 4. The filter drum assembly 6 may include an elongated cylindrical drum 9 mounted for rotation upon suitable bearings 10 which in turn are supported upon a rigid carriage 11 having flanged wheels 12 engageable with a track 13 fixed within the filter shell 2 and with a track 14 carried by a transfer carriage 15 having, in turn, flanged wheels 16 engageable with rails 17 laid perpendicularly to the tracks 13 and 14.

A worm and gear drive unit contained in a housing 18, mounted upon the carriage 11 and associated with the drum 9, serves as a part of the drum drive mechanism and comprises a part of the drum assembly 6. The worm shaft of the mechanism 18 may be provided with a clutch member 19 having a slot extending diametrically across the outer surface thereof as indicated at 20 (see Figure 8). The clutch member 19 is adapted for engagement automatically, upon the movement of the filter drum assembly 6 from the position shown in Figure 3 to the position indicated by dotted lines in Figure 1, with a complementary clutch member 21 mounted upon the end of a drive shaft 22 extending through the side wall of the shell 2, the opposite end of the shaft being connected through a clutch of similar design, as indicated at 23, with the driven shaft 24 of a drive unit 25. It will be understood that in order to effect automatic coupling between the shaft 22 and the worm and gear mechanism 18 of the filter drum assembly that the shaft 22 be turned in the position indicated in Figure 8 with the slot 20 parallel with the axis of the filter drum prior to the removal of the filter unit from the shell and during the return of the unit to the shell in order that the clutch members 21 and 19 may properly disengage and engage respectively.

The wall structure of the filter drum 9 may comprise, as best illustrated in Figure 6, a cylindrical skeleton frame 28 having a plurality of cloth supporting strips 29 fixed thereto upon the outer sides of the frame and extending in a direction parallel with one another and with the axis of the drum. Filter cloth 31 may be fitted over the strips 29 to provide a foraminous drum wall and may be fixed thereto by a continuous wire of helical form encircling the drum on the outer side of the filter cloth, as indicated in Figure 7. The wire 32 performs the dual function of holding the cloth 31 in place securely upon the filter drum frame and also provide a minimum contact surface for the wax cake scraper so that the scraper may not mutilate the filter cloth, as will be hereinafter described.

Figures 10, 11:
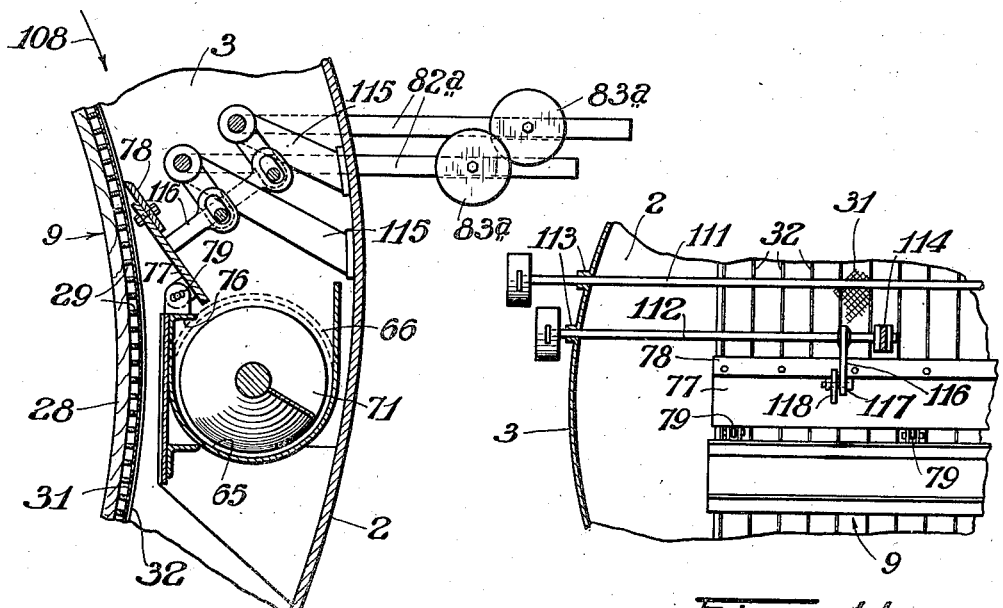
Figure 10 is a view similar to Figure 6 of another form of the scraper mechanism.
Figure 11 is a fragmentary side elevation partially in section of the mechanism of Figure 10.
Figure 9:
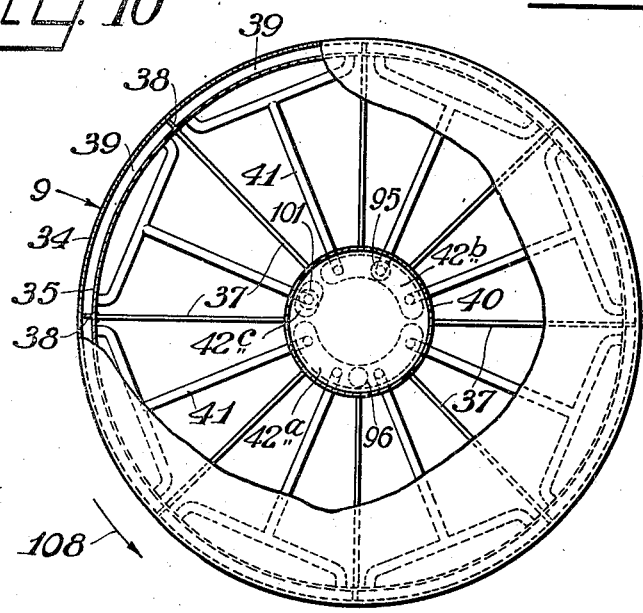
Figure 9 is a schematic view of the filter drum fluid control valve.

Referring to Figure 9 of the drawings it will be noted that the filter drum 9 comprises an outer cylindrical surface 34 (i. e. wire 32, filter cloth 31 and horizontal and peripheral supports 28 and 29—see Figures 6 and 10) within which is included a cylindrical drum 35 attached to hub 40, by spokes 37. Axial partitions 38 between outer cylindrical surface 34 and inner drum 35, form a plurality of spaces 39 into which oil flowing through filter cloth is collected, or into which gas may be blown for blow back purposes (such as loosening the wax cake, etc.). Another function of partitions 38 is to divide the drum circumferentially so that different operations may take place simultaneously on various portions of the drum. Branch pipes 41 establish communication between compartments 39 and valve ports 42$^a$, 42$^b$ and 42$^c$. Sections registering on port 42$^a$ are in position to have filtrate removed, while those registering on 42$^b$ discharge the filtrate obtained during the drying of the cake, and those registering on port 10 are subjected to the gas blow back. Ports 42$^a$, 42$^b$ and 42$^c$ are in communication with filtrate, wash liquid and blow back conduits, 92, 91 and 98 respectively, through engagements at 96, 95 and 101. Arrangement is provided for continuously removing any liquid which may leak into the interior of the drum through connection 105 and conduit 103 (see Figure 2). If considerable leakage of the wax bearing solution into the interior of the drum through the partially submerged valve mechanism occurs then cold propane may be pumped through conduit 103 to the interior of housing 36 causing the leakage to be outward.

Means for introducing the wax slurry or materials to be filtered into the filter shell may comprise a slurry inlet pipe 43 extending through the bottom wall of the shell and connected by a pipe T 44 with distributor pipe 45 extending parallel with the axis of the shell and close to the bottom wall thereof. The distributor 45 may be formed of pipe sections having perforations 46 therethrough which distributes the slurry as it is introduced into the shell along the entire length thereof. A float controlled valve 47 placed in the slurry inlet line 43 may be connected, as through a cable 48 and pulley 49, with mechanism 51 operated by a float 52 placed within the filter shell. As the float falls the valve 47 will open to admit additional slurry and will close as the level thereof rises. This feature automatically assures a proper liquid level of the material to be filtered within the shell.

A plurality of spray nozzles 54 may be located within the shell 2 above the filter drum 9 for the purpose of spraying the wax or filter cake with propane or other solvent to wash the soluble constituents of the cake prior to mechanical removal of the filter cake. The nozzles 54 may communicate with a liquid propane supply pipe 55 through a suitable valve 56, or with a naphtha supply pipe 57 through a valve 58 as desired. The naphtha, in the case of propane dewaxing, is used as a spray for washing the filter cloth without opening the shell. For the sake of safety, drums should be washed with naphtha or steamed out before being opened for repair or replacement.

A propane gas conduit 59 communicates with the interior of the shell 2 at the upper end thereof and is employed to regulate, in part, the pressure of vapor above the slurry in order to maintain a proper pressure differential between the interior and the exterior of the filter, thereby causing liquid to flow through the filter cloth as wax cake is deposited on the cloth. As the drum rotates and the cake emerges from the liquid in the outer shell, propane gas will flow through the cake displacing solution therefrom.

Inspection windows 61 may be formed in opposite sides of the filter shell and closed ducts 62 may be located above the inspection windows, having permanent lights installed therein, so that the operation of the filter may be observed when such is desired.

Located upon the inner wall of the shell 2 at a point above the level of the slurry is a trough 65 extending parallel with the axis of the filter drum and which communicates with a wax discharge pipe 66 connected at 67 with the inlet port of wax pump 68. The wax from the pump 68 may be delivered to a suitable wax still or other apparatus comprising a part of the wax treating installation.

A conveyor screw 71 is located within the trough 65 and extends the full length thereof. The screw may be driven through a suitable drive mechanism mounted upon the "cross" connection or housing 72 forming a part of the wax discharge line 66 and including a drive sprocket 73 connected, through the medium of the drive chain 74, with a sprocket 75 carried by the driven shaft 24 of the drive unit 25. Thus the conveyor screw will operate at all times during the rotation of the filter drum 9. Mounted above the trough 65 upon a steel angle 76 is a wax-cake scraper 77 having a removable blade 78 extending the full length of the filter drum and adapted to bear directly upon the cloth retaining wire 32 thereof. The scraper 77 is preferably hingedly connected to the angle 76 by pivot members 79 providing slight lost motion so as to permit adjustment at the pivotal mounting. A rod 81 fixed relative to the scraper 77 (see Figure 7) extends rearwardly through the end wall 3 of the filter shell and has an arm 82 at its outer end, upon which a weight 83 is slidably mounted whereby the pressure of the scraper blade against the filter drum may be adjusted. The rod 82 further serves as a medium for throwing the scraper 77 backwardly out of engagement with the filter drum as when the drum is removed from the shell or replaced therein.

All of the fluid connections to the filter drum assembly are such as may be established from within the forward end of the filter shell 2 subsequent to the removal of the head 4. These connections include flexible filtrate removal, wash liquid removal, blow-back, and dry port conduits together with suitable quick-detachable couplers therefor.

Our filter is so designed that the filtrate provided during the filtering will flow through one port in the valve mechanism 36 and the mixture of solution and gas from the drying operation will flow through another. Filtrate line 92, and washing solution and gas line 91, are conducted through the shell 2 by nozzles 87 and 86, valves 89 and 88 and joined in header 85, which discharges into either of two compartments of the dewaxed solution surge tank (not shown) depending on the clearness of the liquid. The outer ends of the conduits 91 and 92 may be equipped with quick-detachable couplers 93 and 94 for establishing communication with ducts 95 and 96 respectively of the valve mechanism 36 which forms discharge passageways for the ports 42b and 42a respectively. In like manner a blow-back conduit 97 extending through the side wall of the shell 2 is connected with a flexible conduit 98 having a quick-detachable connection 99 communicating with a duct 101 forming the inlet of the port 42c of the valve 36. A liquid removal conduit 102 also extending through the wall of the shell and connected with a flexible conduit 103 is adapted for quick connection and disconnection to and from the interior of the drum for the removal of leakage therefrom through the valve mechanism 36 and coupler 105. By this simple arrangement an operator standing in front of the shell 2 subsequent to the raising of the head 4 may break all fluid communication to and from the drum unit thereby to permit the withdrawal of the filter drum assembly and the procedure may be reversed when the assembly is returned to the interior of the shell. It will be noted that all of the couplers and flexible conduits forming a part of the filter fluid communication system to and from the filter drum assembly are disposed entirely within the shell 2 so that if by accident leakage should occur no serious damage may take place, such as fire or explosion in the event that propane or other highly inflammable fluid is employed as a diluent.

In operation the filter drum assembly may be moved along the track 17 upon the transfer carriage 15 into registration with a desired filter shell 2 whereupon the assembly may be moved bodily through the medium of its carriage 11 from the track 14 onto the track 13 and into the interior of the filter shell. During movement of the filter drum assembly into the interior of the shell the clutch member 19 will engage with the clutch member 21 to effect driving connection between the drive unit 25 and the filter drum. The operator may then secure the coupler members 93, 94, 99 and 105, thus to establish by simple manipulation fluid communication between the filter drum and the external apparatus forming a part of the slurry preparation and filtrate treatment installation. Subsequent to establishing communication between filter drum and the external fluid system, the head 4 may be lowered and secured in place, whereupon slurry may be admitted through the pipe 43, the level of which will be automatically established at a point slightly below the axis of the drum by the operation of the valve 47 and cooperating float control mechanism 51—52. The filter is thus prepared for use.

The drive unit mechanism 25, which may include an electric motor 107, may now be set in operation to drive the filter drum in the direction of the arrow 108 (see Figure 2). At this time the wax removal conveyor screw 71 will likewise be placed in operation through the medium of the drive chain 74 and transmission contained within the element 72.

A differential in pressure may be maintained between the interior of the slurry containing filter shell and the interior of the filter drum by adjusting the pressures in the external fluid system in such manner that the pressure within the drum interior will be approximately 2 to 4 pounds per square inch less than the pressure in the shell on the outside of the drum. When propane or other similar diluents are employed in making up the slurry, it is of course necessary, for proper operation, to hold the pressure within the drum at a value exceeding the vapor pressure of the diluent, thereby to preclude flashing. As an additional aid in the maintenance of the required pressures within the shell and drum interiors, propane gas or the gas of other diluents employed may be admitted under pressure through the conduit 59 in amounts sufficient to establish favorable operating pressure conditions. With reference to Figure 9, the wax containing oil stock, because of the said pressure differential, will be caused to pass through the filter cloth in the lower, or submerged, portion of the filter drum 9, the wax being separated therefrom in the form of a cake deposit upon the external wall of the drum. The clear filtrate collecting within the sections 39 is free to pass through the branch pipes 41, the duct 96 and outwardly through the filtrate removal conduit 85 by way of the flexible conduit 92.

When the section bearing the washed and dried cake moves into registration with the port 42° of the valve 36, gas, preferably propane gas, is admitted under pressure to the section through pass 97, 98, 99 and 101 to cause the filter cloth to billow outwardly and loosen the cake therefrom so that it may readily be removed by the scraper blade 78. If desired, other gas than propane may be used as a blow-back medium, although in a typical propane dewaxing installation it is preferable to use the gas of the diluent for this purpose.

As the wax is removed from the drum by the scraper blade 78, the pressure of it may be adjusted by moving the weight 83 to suit the thickness of the cake, the wax is caused to fall into the trough 65 where it will be moved by the conveyor screw 71 into the wax discharge line 66 and drawn through the pump 68 for final treatment.

When it is desired to remove the filter assembly 6 from within the shell, either for substitution or examination and the like, the slurry may be drained from the shell and after cleaning out the head 4 may be raised to position shown in Figure 4. With the head thus elevated it is a simple matter for the operator to quickly disconnect the flexible conduits 91, 92, 98 and 103 from the filter drum assembly through the medium of the quick detachable couplers provided therefor, the entire operation being performed at the entrance end of the drum. The carriage 11 bearing the filter drum and comprising a part of the drum assembly may then be withdrawn from within the interior of the shell 2 and upon the track 14 comprising a part of the transfer carriage 15. During the removal and introduction of the filter drum unit from within the shell and return thereof, an operator need only to ascertain that the clutch members 19 and 21 are in the position indicated in Figure 8 so as to enable the members to be disengaged automatically as the drum is moved relative to the stationary shell.

Should it become necessary to inspect the operation of the filter during the filtering process, the operator may, by looking through the windows 61, observe the functioning of the internal elements of the unit, particularly the formation, treatment and removal of the filter cake upon the drum wall, light being supplied from within closed duct 62.

With reference to Figures 10 and 11 of the drawings, we have illustrated therein another form of the scraper pressure control and "throw back" mechanism which, as in the case of the scraper control arm 82, is operated from a point externally of the shell. This form of mechanism possesses the same functional advantages as the mechanism first described, but in addition permits of a more uniform application of pressure to the scraper 77 throughout its relatively extensive length. As shown in Figure 11, we employ a plurality of weight scraper pressure control arms 82ª; in the present instance, two such arms are shown, each being secured at its inner end to rods 111 and 112 respectively, which rods are rotatably mounted at 113 through bearing sleeves formed in the end wall 3 of the shell. The innermost end of the rod 112 rests in a bearing 114 supported upon a bracket 115 fixed upon the inner shell wall. An arm 116 fixed to the rod 112 adjacent to one end of the scraper 77 is pivotally connected at 117 with a lug 118 forming a part of the scraper assembly. The weight 83ª upon the outer end of the pressure control rod thus serves to translate gravitational force into thrust applied to the scraper 77 in the direction of the drum 9 at a point near one end of the scraper as best shown in Figure 11. A similar bearing bracket, arm, pivotal connection, and lug is associated with the rod 111 and with the opposite end portion of the scraper 77 as may be seen in Figure 10, so that the weight 83ª associated with the pressure control rod 111 serves to apply pressure to the opposite end of the scraper. Movement of the weights along the arms 82ª provides for regulation of the pressure applied to the scraper, as desired. Simultaneous upward movement of the arms 82ª will cause the scraper 77 to be moved out of engagement with the drum, as during removal of the assembly from the shell.

While we have made particular reference to the use of our improved continuous rotary filter in the art of dewaxing processes employing as a diluent a fluid having self-refrigerating characteristics, it will be at once apparent that the filter may be applied to many processes requiring filtration of a slurry, and that the filter may be operated either as a pressure filter, as it is when used in a propane dewaxing process, as described, or it may be employed as a suction filter, in which case the interior of the filter shell may be maintained at atmospheric pressure, suction being applied to the filtrate line 85.

We claim:

1. A continuous rotary filter comprising, a gas-tight filter shell having a normally closed entrance opening, a filter drum assembly including a rotatably mounted filter drum having a driving connection, means including a carriage mounted upon rails for moving the filter drum bodily to and from the interior of said shell through said entrance opening, a scraper mounted upon said shell and adapted to engage with said filter drum, means operated externally of the shell for regulating the pressure of said scraper against said drum, a conveyor screw for transferring the filter cake from said shell to a point externally of the shell, a drive unit located externally of the shell, and means interconnecting said drive unit with said conveyor screw and said filter drum driving connection whereby to drive the screw and the drum simultaneously.

2. A continuous rotary filter comprising a gas-tight filter shell having a normally closed entrance opening, a filter drum assembly including a rotatably mounted filter drum having a driving connection, means including a carriage mounted upon rails for moving the filter drum bodily to and from the interior of said shell through said entrance opening, a scraper mounted upon said shell and adapted to engage with said filter drum, means operated externally of the shell for regulating the pressure of said scraper against said drum, a conveyor screw for transferring the filter cake from said shell to a point externally of the shell, a drive unit located externally of the shell, and means interconnecting said drive unit with said conveyor screw and said filter drum driving connection, whereby to drive the screw and the drum simultaneously, said last named means including an automatic clutch between the drive unit and the filter drum driving connection.

3. A continuous pressure filter which comprises a cylindrical pressure vessel provided with a removable end, a rotary filter element in said vessel, a movable frame for supporting said rotary filter element, means for withdrawing said frame from said pressure vessel, a scraper mounted on the inside of said pressure vessel, means for urging said scraper against the surface of the rotary filter during normal operation of the filter, and means for throwing said scraper away from said rotary filter when said filter is withdrawn on its supporting frame from said pressure vessel.

4. In filter apparatus of the class described, an insulated horizontal pressure shell provided with a removable end, means for removably mounting a filter drum in said shell so that the drum will be adjacent the bottom of the shell and will be spaced from the top thereof whereby the shell may serve as a slurry container and whereby cake removal means may be interposed between said drum and said shell, cake removal means secured in said shell between the sides thereof and said drum, means outside of said shell for driving said drum, a separable connection between said driving means and said drum, means for introducing slurry to the lower part of said shell, means for introducing a pressuring gas in the upper part of said shell, a plurality of conduits from said drum extending thru said shell and detachable coupling means adjacent said removable end for disconnecting said conduits when said shell is opened.

5. The apparatus of claim 4 which includes means for spraying the filter cake in the upper part of the shell with a wash liquid.

6. In filter apparatus of the class described, a horizontal pressure shell provided with a removable end, means for removably mounting a filter drum in said shell whereby the shell may serve as a slurry container and whereby cake removal means may be interposed between said drum and said shell, cake removal means secured in said shell between the sides thereof and said drum, means outside of said shell for driving said drum, a separable connection between said driving means and said drum, means for introducing slurry to the lower part of said shell, means for introducing a pressuring gas in the upper part of said shell, a plurality of conduits from said drum extending thru said shell and detachable coupling means adjacent said removable end for disconnecting said conduits when said shell is opened.

PERCY C. KEITH, Jr.
HENRY O. FORREST.
LEE VAN HORN.